(12) United States Patent
Mitchel et al.

(10) Patent No.: US 9,913,422 B2
(45) Date of Patent: Mar. 13, 2018

(54) APPARATUS TO RELIABLY LOCATE PULL-TYPE IMPLEMENT ACCORDING TO A LOCALIZING SIGNAL

(71) Applicant: LaForge Systems, Inc., Cedar Falls, IA (US)

(72) Inventors: Wade Mitchel, Buckingham, IA (US); Joel Kolker, Clear Lake, IA (US); Hubert Defrancq, Guignicourt (FR)

(73) Assignee: LAFORGE LLC, Cedar Falls, IA (US)

( * ) Notice: Subject to any disclaimer, the term of this patent is extended or adjusted under 35 U.S.C. 154(b) by 0 days.

(21) Appl. No.: 15/189,548

(22) Filed: Jun. 22, 2016

(65) Prior Publication Data

US 2016/0366812 A1 Dec. 22, 2016

Related U.S. Application Data

(60) Provisional application No. 62/182,727, filed on Jun. 22, 2015.

(51) Int. Cl.
| | | |
|---|---|---|
| *A01B 63/14* | (2006.01) |
| *A01B 59/00* | (2006.01) |
| *A01B 59/043* | (2006.01) |
| *A01B 63/00* | (2006.01) |

(52) U.S. Cl.
CPC ............ *A01B 63/14* (2013.01); *A01B 59/002* (2013.01); *A01B 59/043* (2013.01); *A01B 63/004* (2013.01)

(58) Field of Classification Search
CPC ... A01B 59/002; A01B 59/043; A01B 63/004; A01B 63/14; B60D 1/44

USPC ............ 172/446, 451, 447; 37/468; 280/468
See application file for complete search history.

(56) References Cited

U.S. PATENT DOCUMENTS

| 1,362,857 | A | * | 12/1920 | Engh | B60D 1/44 |
| | | | | | 280/470 |
| 2,917,323 | A | * | 12/1959 | Mandekic | B60D 1/44 |
| | | | | | 280/470 |
| 3,922,007 | A | * | 11/1975 | Friedebach | B60D 1/44 |
| | | | | | 280/447 |
| 4,262,921 | A | * | 4/1981 | Dwyer | A01B 23/043 |
| | | | | | 172/679 |
| 4,936,390 | A | * | 6/1990 | Anderson | A01B 33/08 |
| | | | | | 172/111 |
| 6,612,774 | B1 | * | 9/2003 | Dulin | E01C 19/266 |
| | | | | | 404/104 |

(Continued)

FOREIGN PATENT DOCUMENTS

EP 2283719 2/2011

*Primary Examiner* — Gary S Hartmann
(74) *Attorney, Agent, or Firm* — Davis, Brown, Koehn, Shors & Roberts, P.C.

(57) ABSTRACT

A shifting module for releasable securement on the lower two arms of a conventional three-point hitch of a tractor and for laterally shifting a pull-type implement mounted on the shifting module. The shifting module includes a lateral support having a pin on either end section for grasping and securement by the lower two arms of the three-point hitch. A traveler is mounted on the lateral support and a linear actuator operates to shift the traveler along the lateral support to any desired position along the lateral support. A hitch on the traveler is used for mounting of the pull-type implement so that the implement can be reliably and accurately positioned along a desired path.

7 Claims, 6 Drawing Sheets

(56) References Cited

U.S. PATENT DOCUMENTS

| | | | |
|---|---|---|---|
| 6,974,146 B2 * | 12/2005 | Abair | B60D 1/246 |
| | | | 280/470 |
| 8,246,271 B2 * | 8/2012 | Verhoff | E01C 19/268 |
| | | | 404/117 |
| 2002/0144829 A1 | 10/2002 | Alexander et al. | |
| 2006/0278413 A1 | 12/2006 | Heitlinger | |
| 2014/0245644 A1 | 9/2014 | Kois | |
| 2015/0117994 A1 | 4/2015 | Defrancq | |
| 2017/0265373 A1 * | 9/2017 | Harnetiaux | A01B 59/042 |

* cited by examiner

APPARATUS TO RELIABLY LOCATE PULL-TYPE IMPLEMENT ACCORDING TO A LOCALIZING SIGNAL

CROSS-REFERENCE TO RELATED APPLICATION(S)

This application claims priority to U.S. Provisional Application No. 62/182,727 filed Jun. 22, 2015 and entitled "Apparatus to Reliably Locate Pull-Type Implement According to a Localizing Signal," which is hereby incorporated by reference in its entirety under 35 U.S.C. §119(e).

BACKGROUND OF THE INVENTION

The present invention relates generally to the adjustment in location of pull-type implements and, more specifically, to an apparatus mounted on a prime mover pulling an implement that will laterally shift the position of the implement relative to the prime mover in response to a localization signal so as to reliably maintain a preselected path.

The practice of precision farming was made possible by the advent of global navigation satellite systems (referred to in the U.S. as GPS). Using GPS-enabled equipment, a farmer can locate a precise position in a field which allows for the creation of maps of the spatial variability of as many variables as can be measured, e.g. crop yield, topography, organic matter content, moisture levels, nitrogen levels, pH, and the like. Manufacturers of precision farming equipment have begun to provide automated steering systems that use the GPS signals to steer a prime mover, such as a tractor, over a predetermined path. While such equipment functions well to reliably and accurately guide the prime mover, variations in soils and topography limit the reliable and accurate positioning of implements pulled by the prime mover.

There have been several attempts in the art to address this issue. One attempt is to provide a steerable unit that moves the implement laterally of the prime mover so that the implement follows the desired path even if the prime mover strays off of the path due to changes in the soil or topography. Another attempt uses a shifting apparatus mounted on the prime mover for laterally shifting the implement to achieve the same result. Yet another attempt modifies the implement hitch to laterally move the working part of the implement relative to the hitch again to achieve the same result.

Each of these attempts have drawbacks. Moving the tractor does not provide sufficient responsiveness to address high frequency changes caused by non-homogenous soil conditions or when there are variations in the topography, such as changing side slope angles. Steering the implement requires expensive and complex equipment and is not always practical, particularly where the implement has coulters or other ground-engaging structures. Such systems often only steer the implement when it is engaged in the ground and so miss the opportunity to guide the implement prior to entry into the ground to ease field entry and line acquisition. Shifting the implement tongue such as proposed by several manufacturers, including MDW, Navigation, Fleischer Manufacturing and Eco-Dan, or as described in European Patent No. EP 2283719, reduce the tractor's versatility, for example by requiring removal of the draw bar or preventing use of a power-driven implement, and negatively impact the weight distribution by moving the load carried by the tractor away from the rear axle.

Accordingly, there is a need for an apparatus that will provide for lateral shifting of a pulled implement so that is will reliably and accurately follow a prescribed path and which will not limit the versatility of the prime mover being used to pull the implement.

SUMMARY OF THE INVENTION

The scope of the invention is to integrate a shifting mechanism for a pull-type implement into the geometry of a standard three-point hitch. The present invention consists of a compact sliding member driven by a hydraulic cylinder to allow for maximum travel within the standard width of the tractor three-point hitch lower links. The compact sliding member is linked to a pair of rods, thus controlling crosswise rotation, that are held in place on each end by yokes that connect to the lower links of the tractor standard lifting device. The relationship between hook point and implement remains unchanged, thus maintaining weight distribution on the tractor as per the original design specification. The present invention includes a laterally shifting traveler which is used to shift the implement from side to side and which includes in combination a pivot pin oriented either horizontally or vertically about which the pull-type implement can pivot.

A sensor measuring the location of the shifting member in relation to the connecting member to the tractor hitch point provide feedback of the correcting action to ensure speedy and accurate correction while remaining stable.

The present invention does not require any change to be made to the tractor standard configuration, but simply requires the standard two lower arms of a standard two-point hitch of the implement to be replaced by the sliding or shifting hitch module of the present invention.

DESCRIPTION OF THE INVENTION

Figure 1:
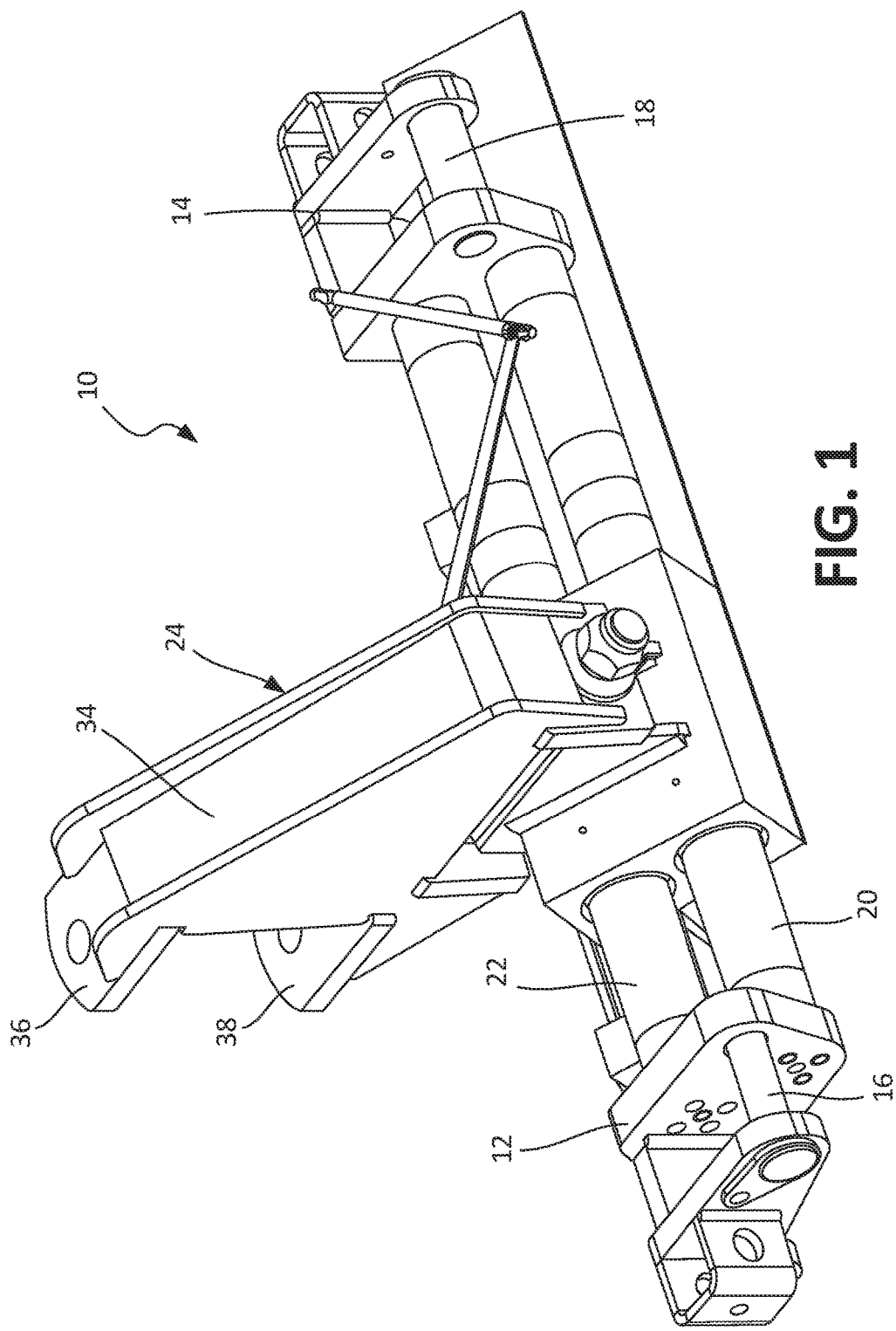
FIG. 1 is a front perspective view of the two-point shifting module according to the present invention.
Figure 2:
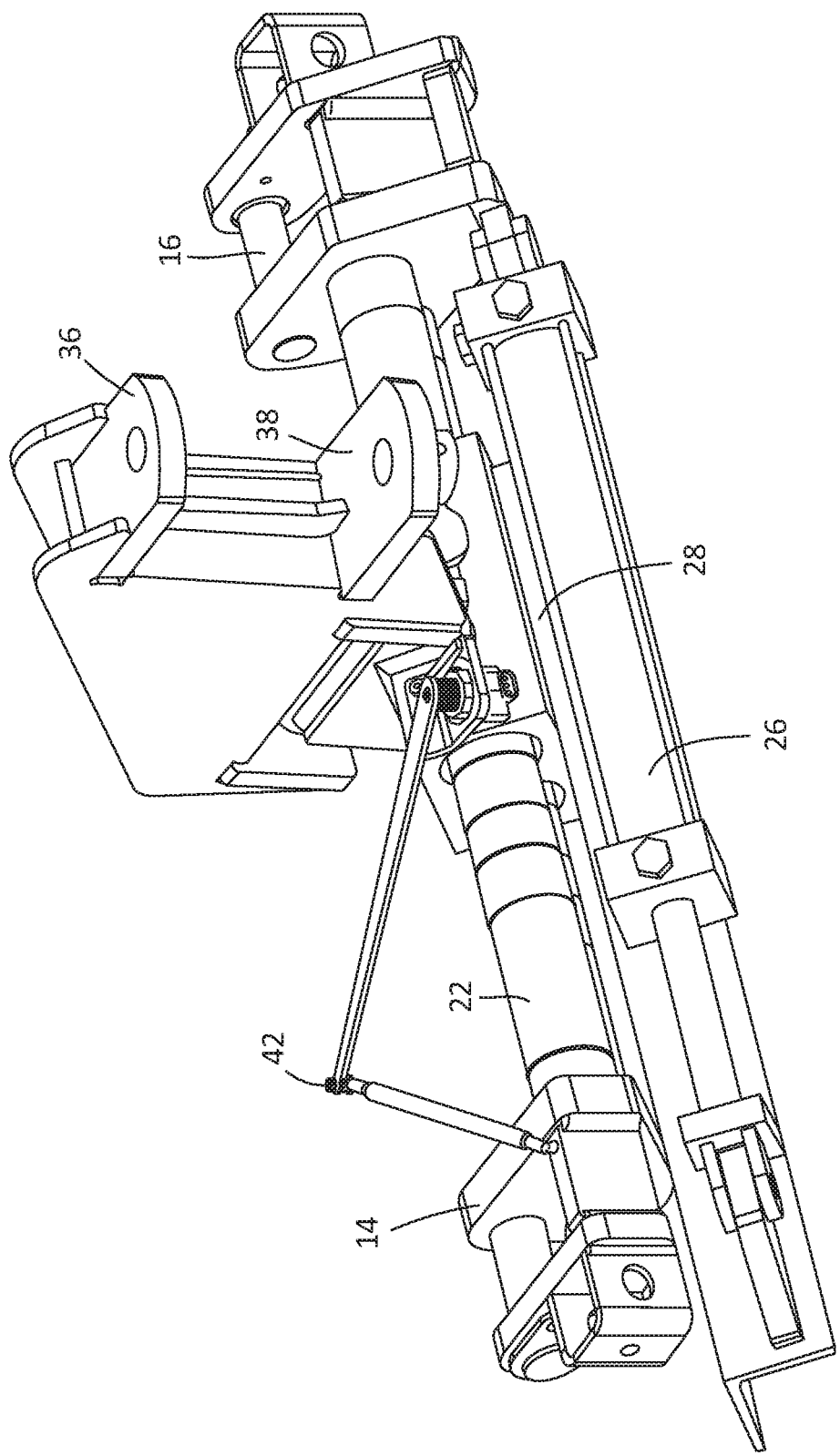
FIG. 2 is a rear perspective view of the two-point shifting module of FIG. 1.

Illustrated in FIGS. 1-5, generally at 10, is a two-point shifting module of the present invention. The shifting module 10 is adapted to be releasably secured to a prime mover, such as a tractor (not shown) having the conventional three-point hitch used to attach implements to the tractor. Specifically, the shifting module has a pair of attachment yokes, right yoke 12 and left yoke 14 (right and left are defined in relation with the direction of travel of the tractor at work). The right and left lower hitch arms of the tractor three-point hitch releasably grab a corresponding one of corresponding pins 16 and 18 of the yokes 12 and 14. Only the two lower points of the tractor three-point hitch are consequently used.

A pair of parallel rods 20 and 22 extend laterally between and interconnect the two yokes 12 and 14. A mobile member or traveler 24 is mounted on the rods 20 and 22 for lateral, traveling movement between a right position adjacent the right yoke 12 and a left position adjacent the left yoke 14. The pair of rods 22 and 24 prevents relative pivotal movement of the yokes 12 and 14 and assure linear motion of the traveler 24 along a fixed axis while preventing pivotal movement of the traveler 24 about its axis of travel. Movement of the traveler 24 is achieved by a linear actuator 26 which is secured at one end to the traveler 24 by a mating member 28 and at the other end to the yoke 16. In a preferred embodiment, the mating member 28 is a piece of angle iron that is bolted on one face to the traveler 24 and is connected on the opposite face to the actuator 26. Extension and retraction of the actuator 26 moves the traveler 24 between its right and left positions.

Included in the traveler 24, preferably on its top side, is a tube 30 that extends horizontally in use and perpendicular to the rods 20 and 22. Journaled within the tube 30 is a pivot pin 32, best seen in FIG. 5, at either end of which a member 34 of the pull-type implement is mounted for pivotal movement about the axis of the pivot pin 32. Extending from the pivot member 34 are a pair of spaced, parallel flanges 36 and 38. A pair of vertically aligned openings in the flanges 36 and 38 receive a pin (not shown) which is used for mounting of a pull-type implement frame to be controlled by the shifting module 10. Since the pivot member 34 is supported on the pivot pin 32 held within the tube 30, pivot member 34 can pivot about the horizontal axis of tube 30. Further, the implement can pivot about the vertical axis of the pin received in the openings of the flanges 36 and 38. Finally, the implement can pitch relative to the tractor about the transverse axes of the pins 16 and 18 of the yokes 12 and 14, thus providing a horizontal pivotal axis, a transverse pivotal axis and a vertical pivotal axis for the pull-type implement. Accordingly, the implement can pivot, roll and/or pitch corresponding to ground contour variations and to follow the tractor when turning.

Figure 3:
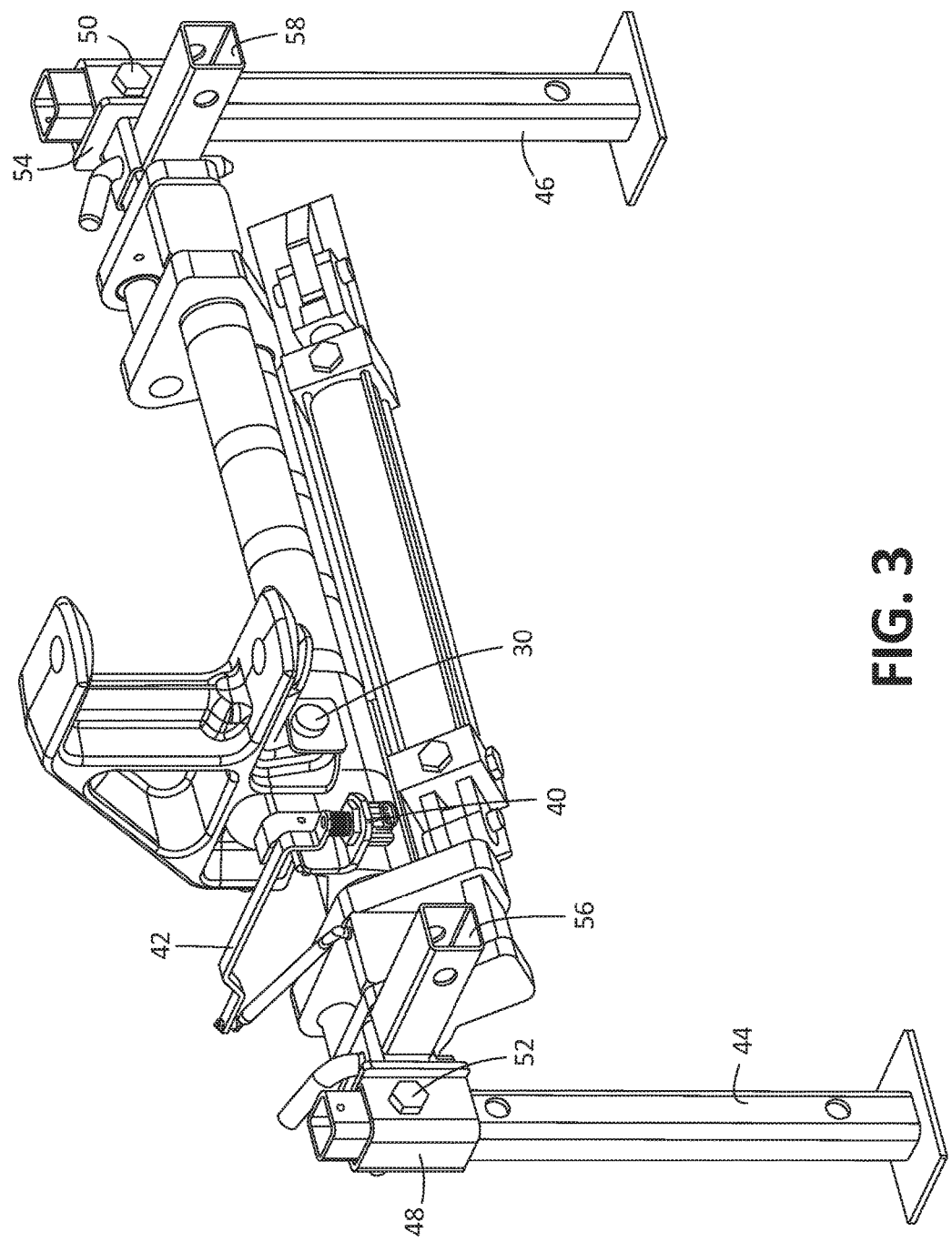
FIG. 3 is a rear perspective view of the two-point shifting module shifted to the left and showing the unit with parking stands in place for supporting the module when it is disconnected from the tractor.

Referring to FIG. 3, there is a feedback sensor 40 that is operated by a two-bar linkage 42 to deliver a signal that corresponds to the lateral position of the traveler 24 relative to the two yokes 12 and 14. The signal from the feedback sensor 40 is used in a controller (not shown) to provide smooth, fast and accurate information about the lateral position of the traveler 24 and thus also of the pull-type implement mounted on the pivot member 34.

Figure 4:
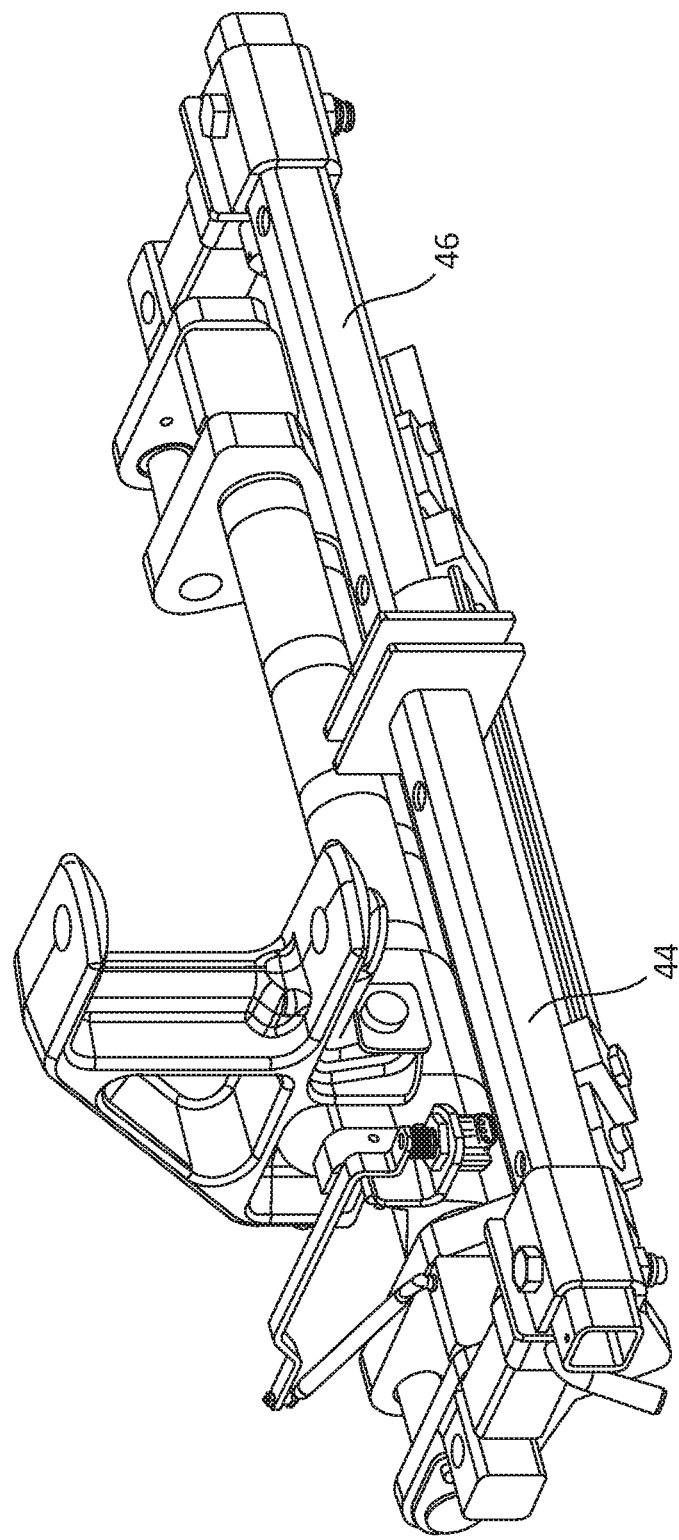
FIG. 4 is a rear perspective view of the two-point shifting module shifted to the left and showing the unit with parking stands in stored position when the implement is connected to the tractor.
Figure 5:
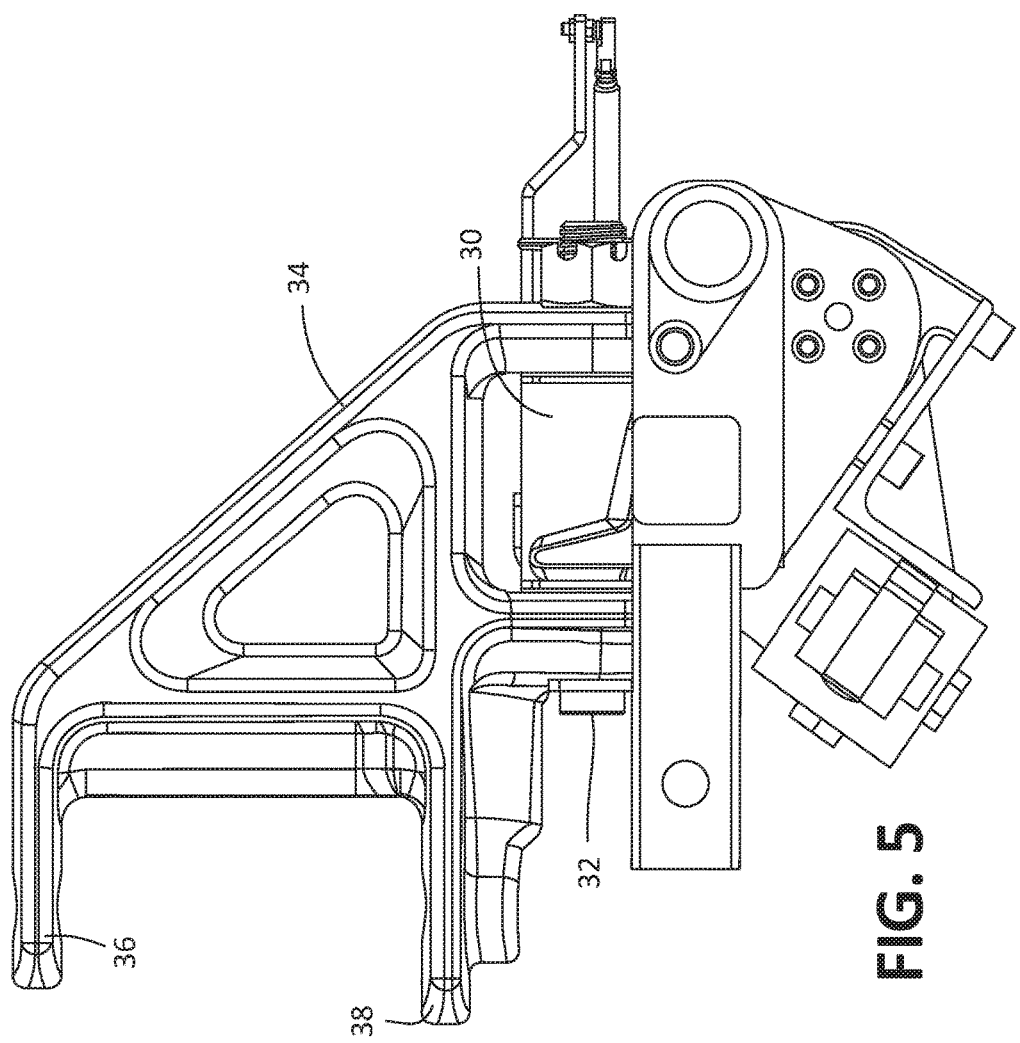
FIG. 5 is a left side view of the two-point shifting module, without stands.

In a preferred embodiment, a pair of stands 44 and 46 are provided to support the shifting module 10 above the ground at a convenient mounting height when removed from the tractor. A pair of vertical receivers 48 and 50 and corresponding pins 52 and 54 are used to releasable mount the shifting module 10 on the stands 44 and 46. When the shifting module 10 is mounted on the tractor, the stands 44 and 46 may be conveniently mounted on the shifting module 10 by a pair of horizontal receivers 56 and 58 using the same pins 52 and 54 (FIG. 4).

Figure 6:
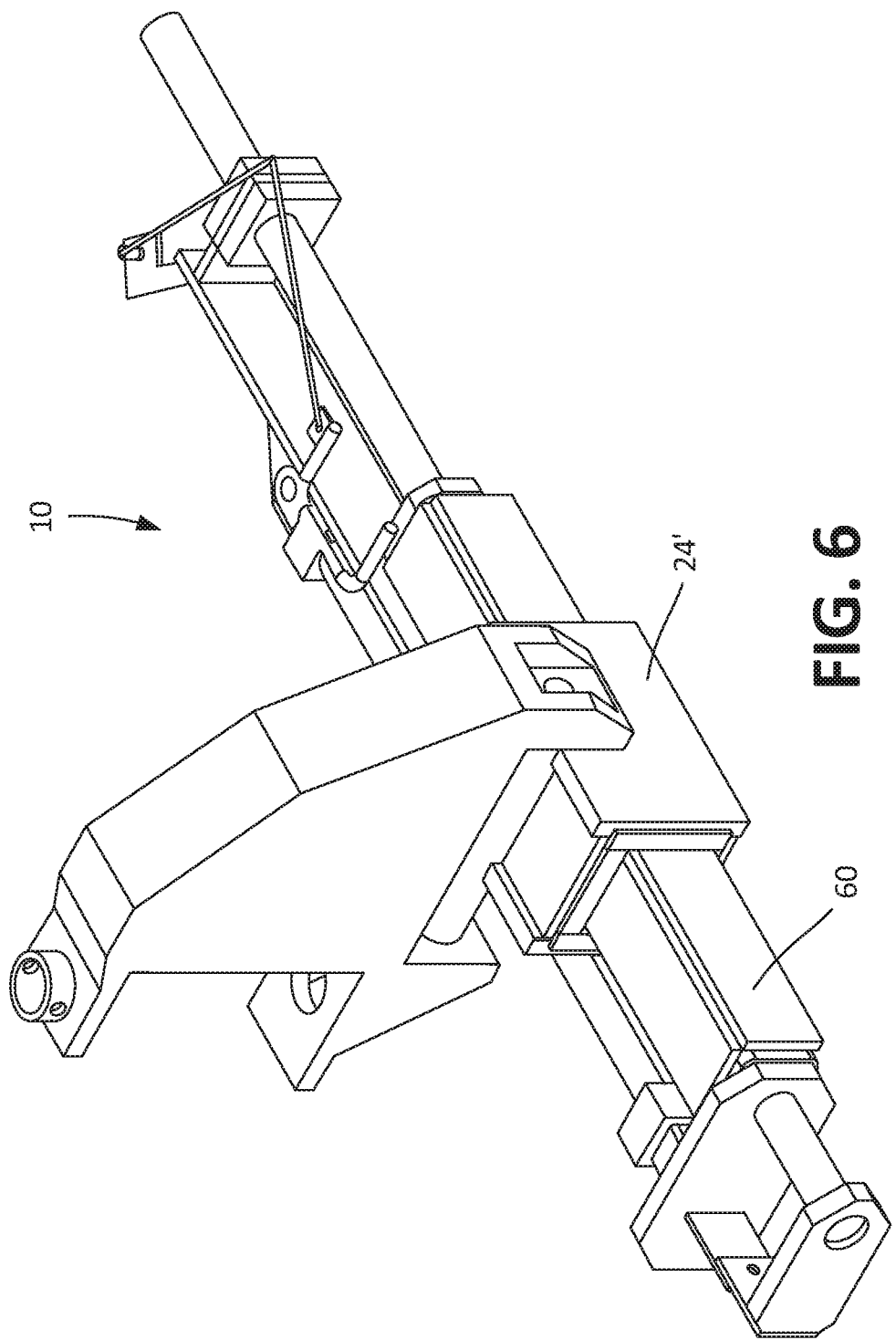
FIG. 6 is a front perspective view of an alternative embodiment of the two-point shifting module of the present invention.

FIG. 6 shows an alternate preferred embodiment of the present invention. The tractor mating pins 16 and 18 are now connected to a single square structure 60 on which is mounted the traveler 24' which had been modified to accept the square structure 60. The square shape prevents rotation hence the need for only one mounting member 60. While this configuration is more difficult to seal, it does ensure the same technical result as shown in FIGS. 1-5 when the linear actuator 26 is operated.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A shifting module for releasable securement on the lower two arms of a conventional three-point hitch of a tractor and for laterally shifting and permitting three degrees of freedom of a pull-type implement mounted on the shifting module, comprising:
    (a) a lateral support comprising first and second elongate parallel rods disposed between first and second yokes, the yokes comprising pins for grasping and securement by the lower two arms of a conventional three-point hitch, wherein the rods are configured to permit implement pitch;
    (b) a traveler mounted on the lateral support;
    (c) a linear actuator disposed parallel to the first and second elongate operable to shift the traveler along the lateral support; and
    (d) a pivot member comprising:
        (i) at least one flange configured to receive a substantially vertical mounting pin and configured to permit implement rotation about the vertical axis; and
        (ii) a substantially horizontal pivot pin journaled within a tube, the tube extending perpendicular to the elongate rods and configured to allow for horizontal pivoting of the implement.

2. A shifting module as defined in claim 1, further comprising a sensor to provide a signal responsive to the position of the traveler on the lateral support.

3. A shifting module as defined in claim 1, wherein the linear actuator is a hydraulic cylinder.

4. A shifting module as defined in claim 1, further comprising a pair of stands moveable between a horizontal storage position on the module where they do not interfere with the operation of the module and a vertical support position wherein they support the module when not in use.

5. A shifting module as defined in claim 1, further comprising a two-bar linkage.

6. A shifting module as defined in claim 1, wherein the traveler comprises parallel flanges.

7. A shifting module as defined in claim 1, further comprising a mating member, wherein the mating member defines first and second openings for passage of the first and second elongate rods.

* * * * *